(12) United States Patent
Davis et al.

(10) Patent No.: US 10,229,121 B2
(45) Date of Patent: *Mar. 12, 2019

(54) DETECTION OF FILE CORRUPTION IN A DISTRIBUTED FILE SYSTEM

(71) Applicant: International Business Machines Corporation, Armonk, NY (US)

(72) Inventors: James C. Davis, Blacksburgh, VA (US); Willard A. Davis, Rosendale, NY (US); Felipe Knop, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

This patent is subject to a terminal disclaimer.

(21) Appl. No.: 15/070,227

(22) Filed: Mar. 15, 2016

(65) Prior Publication Data

US 2017/0091086 A1 Mar. 30, 2017

Related U.S. Application Data

(63) Continuation of application No. 14/869,091, filed on Sep. 29, 2015, now Pat. No. 10,025,788.

(51) Int. Cl.
*G06F 11/00* (2006.01)
*G06F 17/30* (2006.01)
(Continued)

(52) U.S. Cl.
CPC ...... *G06F 17/3007* (2013.01); *G06F 11/0727* (2013.01); *G06F 11/0766* (2013.01); *G06F 11/3688* (2013.01); *G06F 17/30194* (2013.01)

(58) Field of Classification Search
CPC combination set(s) only.
See application file for complete search history.

(56) References Cited

U.S. PATENT DOCUMENTS 5,835,428 A * 11/1998 Kobayashi ....... G01R 31/31935
365/201
7,155,558 B1 * 12/2006 Vaghani ................ G06F 3/0607
711/117

(Continued)

OTHER PUBLICATIONS

James C. Davis et al., Pending U.S. Appl. No. 14/869,091 entitled "Detection of File Corruption in a Distributed File System," filed with the U.S. Patent and Trademark Office on Sep. 29, 2015.

(Continued)

*Primary Examiner* — Amine Riad
(74) *Attorney, Agent, or Firm* — Cantor Colburn LLP; Teddi Maranzano (57) ABSTRACT

Aspects include testing distributed file systems by selecting a file in a multiple writer environment and selecting an offset of a block in the file. Test data is generated for the block by randomly selecting a starting value from a plurality of possible starting values. A test header that includes the starting value and a test data sequence that starts with the starting value is created. A file system that is being tested writes the test header and the test data sequence to the block. Contents of the block are read by the file system that is being tested, and expected contents of the data sequence are determined based on contents of the read header. The expected contents of the data sequence are compared to the read data sequence and an error indication is output based on the expected contents not being equal to the read contents.

8 Claims, 5 Drawing Sheets

(51) Int. Cl.
*G06F 11/36* (2006.01)
*G06F 11/07* (2006.01)

(56) References Cited

U.S. PATENT DOCUMENTS

| | | |
|---|---|---|
| 7,681,069 B1 | 3/2010 | Chellappa et al. |
| 7,941,455 B2 * | 5/2011 | Wanigasekara-Mohotti ............... G06F 17/30067 707/802 |
| 8,078,909 B1 * | 12/2011 | Satish ................... G06F 11/302 714/15 |
| 8,504,518 B1 | 8/2013 | Ghemawat et al. |
| 2002/0083120 A1 * | 6/2002 | Soltis .................... G06F 3/0605 709/200 |
| 2004/0153479 A1 * | 8/2004 | Mikesell ............. G06F 11/1096 |
| 2008/0282121 A1 * | 11/2008 | Rajeev ................... G11C 29/44 714/719 |
| 2011/0179082 A1 * | 7/2011 | Vaghani ............ G06F 17/30008 707/781 |
| 2017/0193004 A1 | 7/2017 | Karuppusamy et al. |

OTHER PUBLICATIONS

List of IBM Patents or Patent Applictions Treated as Related; (Appendix P), filed Mar. 15, 2016, 2 pages.

* cited by examiner

DETECTION OF FILE CORRUPTION IN A DISTRIBUTED FILE SYSTEM

DOMESTIC PRIORITY

This application is a continuation of U.S. patent application Ser. No. 14/869,091, filed Sep. 29, 2015, the content of which is incorporated by reference herein in its entirety.

BACKGROUND

The present invention relates to distributed file systems (DFSs) and, more specifically, to the detection of file corruption in a DFS.

File systems provide methods and data structures used by operating systems to keep track of files on a disk or partition. A DFS provides methods of storing and accessing files based on a client/server architecture. In a DFS, one or more central servers store files that can be accessed, with proper authorization rights, by any number of remote clients in the network. Much like an operating system organizes files in a hierarchical file management system, the distributed system uses a uniform naming convention and a mapping scheme to keep track of where files are located. When the client device retrieves a file from the server, the file appears as a normal file on the client machine, and the user is able to work with the file in the same ways as if it were stored locally. When the user finishes working with the file, it is returned over the network to the server, which stores the now-altered file for retrieval at a later time. When DFS is utilized, multiple processes on the same or different nodes can interact concurrently with the same file, and the DFS has semantics that define whether or when the clients can see the updates made by other processes. DFSs can be advantageous because they make it easier to distribute documents to multiple clients and they provide a centralized storage system so that client machines are not using their resources to store files.

SUMMARY

Embodiments include a method, system, and computer program product for detection of file corruption in a distributed file system. A method includes selecting a file in a multiple writer environment and selecting an offset of a block in the file. Test data is generated for the block by randomly selecting a starting value from a plurality of possible starting values; creating a test header that includes the starting value; and creating a test data sequence that starts with the starting value. A file system that is being tested writes the test header and the test data sequence to the block in the file. Contents, including a read header and a read data sequence, of the block are read by the file system that is being tested. Expected contents of the data sequence are determined based on contents of the read header. The expected contents of the data sequence are compared to the read data sequence and an error indication is output based on the expected contents not being equal to the read contents.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments include techniques for detection of file corruption in a distributed file system (DFS) by validating DFS behavior in a multiple reader/writer environment. An embodiment includes creating a file writing pattern using a seedable random pattern generator and keeping the history of the test patterns for later "expected state" analysis. The history, which can be stored in a journal file, can be used to create effectively "N" possible expected states depending on what may have failed. Embodiments can also be used to detect and diagnose partial write outcomes as well as stale reads and dropped writes in a multiple writer file system environment. As used herein, the term "multiple writer environment" refers to an environment where multiple processes can be reading or writing one or more files at the same time, with well defined behavior for reading file contents. In embodiments where the file system is POSIX® compliant, testing can be continued in the presence of node failures that occur due to the detection of dropped writes and/or stale reads. Embodiments described herein can provide the ability to detect corruption, provide proof that a file system error has occurred, and accurately point to the location of the corruption along with indicating the expected contents of the location.

Contemporary approaches to detecting file corruption in a DFS generally provide insufficient details for a file system developer (or other user) to identify and fix the underlying problem. Many of the existing solutions also are not designed with a DFS in mind, and as such they are not suitable for a rigorous test in such an environment, where multiple nodes can be writing simultaneously. Embodiments describe herein can be used by anyone performing acceptance testing for a file system (e.g., a customer on a "try-and-buy" test, and a file system developer).

The data useful to file system developers when testing a file system (e.g., DFS) can include, but are not limited to: the host name and process identifier (ID) of the writer; the time of the write; and the expected file contents. If this information can be provided to them in a timely fashion, then the DFS product can be fixed and testing can continue. In a try-and-buy setting, a quick turnaround on debugging and fixing can be very important. Testing can also be expedited by providing human-readable content (instead of binary or arbitrary data), since when using human-readable contents it is clear to anyone reading the file what the data is and how it is represented, and thus a familiarity with the program implementation is not required.

Various contemporary approaches to file corruption detection can be found in industry-standard file system tests and benchmarks. Contemporary implementations generally take on one of two forms: (1) fill a file with a repeated constant byte (like 'AAAA') or short byte sequence ('ABABABAB') and then check if the data in the file is 'AAAA' (or 'ABABABAB') later on; and (2) write random data to a file, compute a checksum, and then later compare the recorded checksum with the current data in the file. More sophisticated contemporary approaches can include tracking file contents in a journal and copying test data from a trusted file system instead of using a constant byte or short byte sequence. Drawbacks to storing a single repeated byte in a file and reading it back is that it assumes that a read ( ) truly returns the data at the specified offset and also that subsequent writes do not fail silently; this approach relies on what may be an inappropriate level of trust of the file system, since silent write failures and stale read failures are both possible and undesirable. Another drawback to contemporary approaches is that a binary response (either a file has been corrupted or a file has not been corrupted) is often an insufficient level of detail for developers to debug and fix the problem. In addition, contemporary approaches that were designed for a single-process, single-thread environment are often not readily extendable to a DFS environment. A further drawback to contemporary approaches is that they do not take into consideration the possible resulting file contents in the event of a file system or node crash.

Embodiments described herein include a file format of sufficient complexity to protect against basic forms of file system failure and that provides developers useful information for error analysis. This format can be useful for testing any type of file system, distributed or not. Embodiments include a method for using the file format to test a DFS. A version of the file format can be used to detect dropped writes and stale reads. Embodiments further include a method to detect and continue testing in the presence of node failures when the file system is POSIX compliant.

As used herein, the term "node" refers to an operating system instance, virtual or physical, that has a file system installed and in use or that is configured with access to a DFS.

As used herein, the term "process" refers to one instance of the test program. Multiple processes may be run on a single node, but typically one process is executed on a single node. Each process can spawn one or more threads.

As used herein, the term "thread" refers to one thread of execution. A process may have any number of threads.

As used herein, the term "byte-range lock" refers to a means by which a thread can be granted exclusive rights to a portion of a file.

As used herein, the term "synchronous write" refers to a write that requires the data to be actually stored on disk before the write call returns to the thread.

As used herein, the term "POSIX-compliant" refers to a file system that purports to match the published POSIX specifications.

As used herein, the term "distributed file system" or "DFS" refers to a file system that presents a shared namespace for multiple nodes simultaneously. An example of a DFS is IBM Spectrum Scale™ from IBM®.

As used herein, the term "file system block" is the largest unit of input/output (I/O) done at a time. That is, a file system uses blocks as the largest unit of I/O. A file system block is composed of file system sectors which are the smallest addressable units in a file system.

An application block is stored in one or more file system blocks. A file system block may contain some or all of one or more application blocks. As used herein, file system blocks and application blocks are conceptually independent (e.g., the application block size can be smaller or larger than the file system block size and/or the application may not even know what the file system block size is). As used herein, the term "application block" refers to the unit of I/O of an application. The application block must be larger than the size of the application block header, since an application block must contain at minimum an application block header and one byte for the data portion. An application block header is a human-readable summary of an application block that precedes the data portion of an application block. Application block data is the data portion of an application block that follows the application block header. Thus, each application block includes an application block header followed by application block data.

Embodiments write in units of one application block (also referred to herein as a "block") when performing I/O to a file system. An application block is a region of arbitrarily large size and it is human readable. In an embodiment, an application block includes two portions; a header containing metadata for the write, and a data section, including a data sequence. The header can be written in ASCII for human-readability and it can contain a number of fields written in a colon-delimited format.

Figure 1:
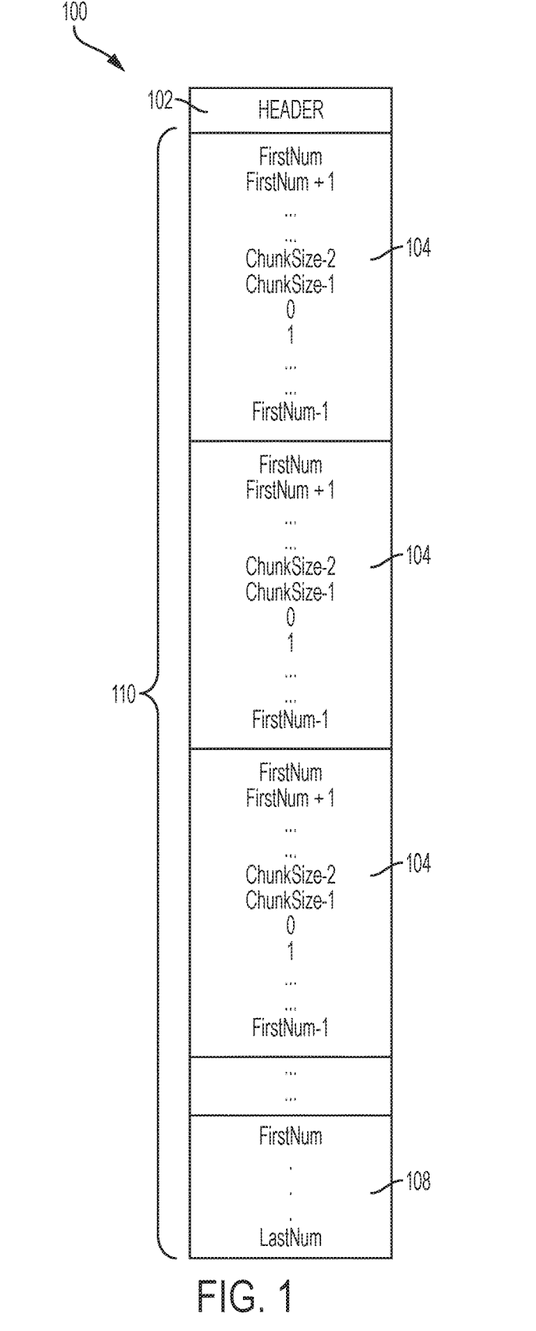
FIG. 1 depicts a block diagram of an application block in accordance with some embodiments of this disclosure.

Turning now to FIG. 1, an application block 100 is generally shown in accordance with an embodiment. The embodiment includes an application block header 102 and application block data 110. As shown in the embodiment of FIG. 1, the application block data 110 includes a sequence of data that includes a last chunk 108 preceded by optional repeated chunks 104. An embodiment of content of the application block header 102 can include but is not limited to: a HeaderID that is a unique identifier of the application header (e.g., a random number sampled from a large uniform distribution to make it extremely unlikely for any two randomly-chosen headers to have the same HeaderID); an Offset which is the file offset at which the application block begins; a KernelThreadID that is the kernel thread ID of the thread doing the write; a HeaderStringLen that is the length of the header (e.g., in bytes) for ease of parsing; a BlockSize which is the size of the application block (including the application header and the application data); an inode which is the inode number of the file; a ChunkSize which is one more than the largest integer in the chunks that compose the data portion of the application block; a FirstNum that is the first number in the repeated chunks 104 in the data section which is used as described below to function as a checksum for the data section (e.g., randomly chosen from a number between zero and one less than the ChunkSize); a LastNum that is the last number in the last chunk 108 in the data section of the application block (an optional field calculated based on the size of the application block data 110 and the ChunkSize); a HostName which is the name of the host computer that wrote the block; and a WriteTime which is the time at which the block was written. As used herein, the term "inode" refers to a data structure used to represent a file system object in a Unix style file system, which can be one of various things including a file or a directory. Each inode can store the attributes and disk block location(s) of the file system object's data. Each file can have its own unique inode number. In embodiment, the application block header 102 is padded to ensure that the data portion is evenly divisible by the ChunkSize. This can make it easier to generate the data portion of the application block. Other embodiments of the application block header can be implemented that include additional content and/or a subset or superset of the described content.

Figure 2:
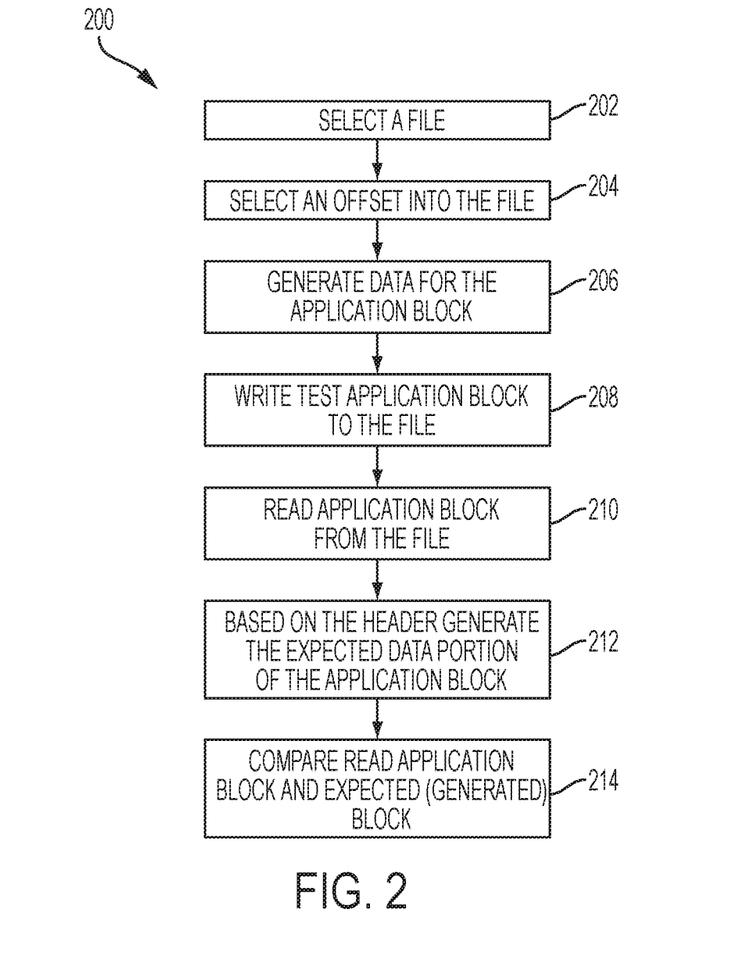
FIG. 2 depicts a file system testing process in accordance with some embodiments of this disclosure.

Referring to FIG. 1, in an embodiment, the contents of the application block data 110 can include a first intermediate chunk 104 of the form: [FirstNum, FirstNum+1, . . . , ChunkSize−2, ChunkSize−1, 0, 1, . . . , FirstNum−1]. As described previously, FirstNum can be chosen at random (e.g., uniformly from [0,chunkSize−1]) when the application block 100 is generated. The random choice of FirstNum means that if the file system returns data from the wrong file system block (e.g., from the same offset of an incorrect file system block)), then the data is extremely unlikely to match the expected data, allowing detection of errors of this form. In embodiments where the number of bits in the application block data 110 portion of the application block data 110 is evenly divisible by the ChunkSize, the last chunk 108 will have the same contents as the intermediate chunks 104. However, in embodiments where the number of bits in the application block data 110 portion of the application block data 110 is not evenly divisible by the ChunkSize, the last chunk 108 can start in a similar fashion as the intermediate chunks 104 but end at a value of LastNum which can be stored in the application block header 102. Turning now to FIG. 2, a file system testing process 200 is generally shown in accordance with an embodiment. The processing shown in FIG. 2 can be performed by an embodiment of a file system test application executing on a processor. At 202, a file is selected at random from a set of user specified files, and at 204 a random offset into the file is selected. In an embodiment, offsets are chosen on an application-block-size boundary. Note that the application block size is not necessarily the same as the underlying block size for the file system, which can be useful for testing purposes. For example, choosing an application block size relatively prime to the file system block size makes the risk of incorrect reads matching the "correct read" vanishingly small.

Having chosen the offset at 204, 206 is performed to generate test data for the block in the manner described above, with the resulting application block including an application block header 102 and a test data sequence that includes a plurality of chunks in the application block data 110. At 208, a write call is made to write the generated test data sequence in the application block 100 to the selected file at the selected offset. The write can be performed using any number of underlying OS interfaces, such as but not limited to: a traditional write call, mmap, vectored I/O, and asynchronous I/O. The underlying OS interface can vary based on the intent of the test.

At 210 the application block is read from the selected file at the selected offset. At 212 the header is extracted from the read application bloc. Based on firstNum and blockSize, the expected block is generated. The generated test application block is compared to the read application block. In an embodiment, to verify data integrity, each block is read from each file during the process of testing of the file system. The block size can be provided to the verifying program as an argument or can be determined through examination of the log of the program that made the writes. In an embodiment, all applications must use the same application block size. In an embodiment, the application block header is parsed for correctness. Using the FirstNum, the BlockSize, and the HeaderStringLen stored in the read application block header, a new block is generated which is expected to match the block read by the file system. The data that was read (e.g., the read application block) and the test data that was generated (e.g., the expected application block based on the header of the read application block) are compared for a match. If a mismatch is found, the exact offset and expected bytes are logged and an error message is generated. The error message can include, but is not limited to: an exact offset; an expected byte value; an observed byte value; an inode number; and/or a time of the error. Additional data can be provided in the error message if it is available, such as but not limited to: host name; kernel thread identifier; and/or process identifier; time of the last write to the file (e.g., as listed in the header portion of the block containing the corruption).

The system cannot rely on the application block that was written in 208 to still be present in the file at that offset. Multiple instances of the test application could be active, and if they select the same file and offset at the same time, the contents are subject to a race condition.

The process shown in FIG. 2 can have several advantages over contemporary file system testing methods. As described above, current techniques are generally based on writing a single repeated byte, a small repeating string, or one of a small number of possible strings. Suppose that the file system being tested occasionally returns the data from the wrong offset. This behavior is incorrect, and an error detection algorithm should be able to find it. However, testing that is performed using a repeating byte or string makes it unlikely or impossible to detect this error, since one portion of the file looks just like another. This implies an inappropriate level of trust of the file system since this behavior will often not be detected during testing. In addition, from a debugging the file system perspective, the human-readable blocks provided by embodiments allow the developer to see exactly what content is supposed to be in the file, and it can be compared to the actual content returned by the file system to find issues and patterns much more easily than random looking data (e.g., like that produced by the file system exerciser "fsx"). If multiple developers are involved on a project, embodiments do not require that they all need to be experts with the workings of the file system test application in order to perform debugging activities. Further, by including the meta-information (e.g., the KernelThreadID involved in each write) in the application block header, embodiments can facilitate debugging of issues arising in the file system. Still further, as write( ) and read( ) are atomic, embodiments can be used in a single-node as well as in a multithreaded and/or multi-process setting without the need for locks, provided no node failures occur; if node failures occur, read( ) and write( ) cannot be assumed to be atomic. The atomicity of write( ) and read( ) means that when a write( ) occurs, it is an all-or-nothing operation: a concurrent read( ) will get back the prior contents or the contents after the write( ), but not a mix of stale and new content. However, the read( ) is therefore handicapped in the verification that it can do. Without locks, it does not know what application block it expects to read. Therefore, in this embodiment, the verification in the read path it is restricted to simply verifying that the application block is internally consistent based on the contents of the block header.

Embodiments of the file format can be used to test a DFS to ensure that multiple threads and nodes can interact with the same set of files without introducing corruption. In embodiments, the file system under test provides write atomicity which is required for all POSIX-compliant file systems. If a file system provides write atomicity within a file, then a write ( ) is an all-or-nothing operation. Either all of the write gets queued to go onto disk (success) or none of it does (failure). Furthermore, write atomicity implies that two concurrent write( ) calls to the same offset of the same file will result in file contents matching one of the write( )s. If a file system does not provide write atomicity then the result of concurrent write ( ) calls to the same offset of the same file will result in each byte in the affected range being from one write or the other in an unpredictable fashion.

For the distributed case where a DFS is being tested, the process shown in FIG. 2 is invoked on multiple nodes simultaneously, each working on the same set of files and selecting random files and offsets for I/O. Each thread from the same or different processes chooses from the same set of possible offsets in order to test the DFS for correctness.

If the file system under test does not provide write atomicity (or if the write atomicity attribute is under test), a file locking mechanism is required in order to enable verification of the file contents. Embodiments described herein use IBM Spectrum Scale as an example of a file system that is being tested. IBM Spectrum Scale supports the POSIX file control interface "fcntl( )" which ensures that access to a particular block of a particular file is serialized to allow content verification. The fcntl( ) can be utilized to ensure consistency between what is written to the file under test and the journal file, and to ensure the write to a given application block is atomic. The journal file can be written in the same file system as the one being verified, or by another file system instance supported by the same file system implementation.

In other embodiments, where a file system that does not support POSIX is being tested or where the write atomicity is itself under test, another file locking mechanism can be utilized.

Embodiments can also utilize journal files to provide additional information about the expected data when file corruption is detected. For example, file system errors such as dropped writes to a block and/or stale data being returned on reads to a block can be detected using a journaling approach that provides a history of writes to a block. When implementing journaling, a method of file locking becomes important in order to make interaction with a file and its corresponding journal entry atomic. In an embodiment, each write is tracked in a journal file that is stored in a trusted shared file system (e.g., different from the file system being tested) that is mounted on each node alongside the file system being tested. Each file can have its own journal file of the form:

---

BLOCK 1
    Most recent record: <slot number>
    RECORD SLOT 1
    RECORD SLOT 2
    . . .
    RECORD SLOT N
BLOCK 2
    Most recent record: <slot number>
    RECORD SLOT 1
    RECORD SLOT 2
    . . .
    RECORD SLOT N
    . . .

---

The value of N is equal to or larger than one and can be determined (and varied) based on application requirements. Larger values of N give a longer write history for debugging purposes. In an embodiment, the record in each record slot is a copy of the application block header from the application block that is written to the main file. As used herein, the term "main file" refers to the file residing in the file system under test that is associated with the journal file in question. Embodiments utilize pairs of files that include a main file and a journal file. Every write that happens can be reflected inside a journal file, and all writes to the journal file can be performed synchronously to ensure that the journal file is always up to date.

Figure 3:
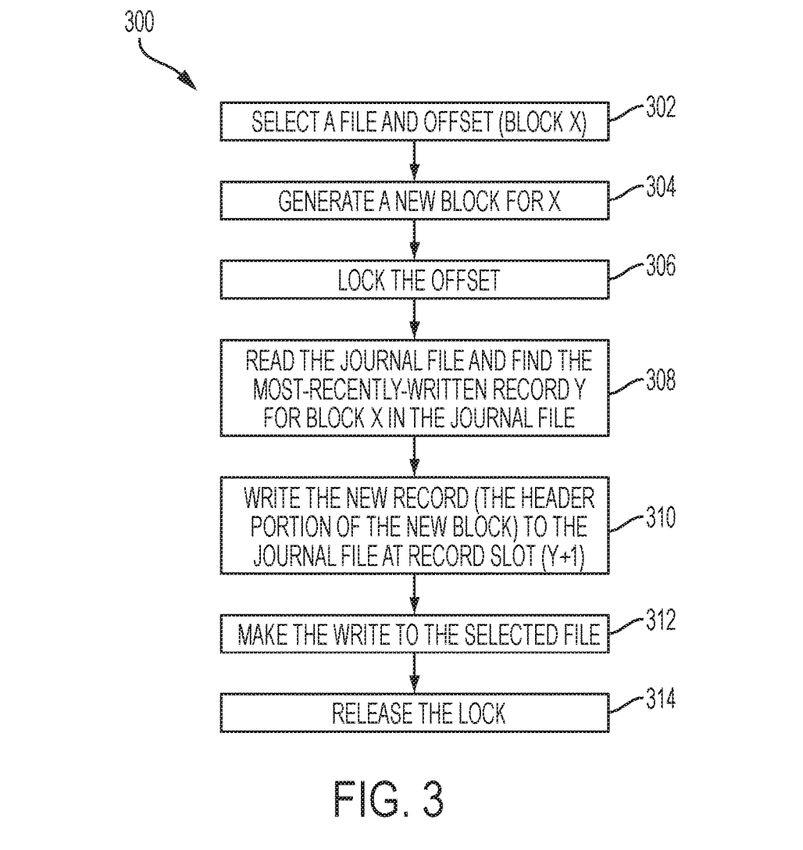
FIG. 3 depicts a write path process that includes writing to a journal file in accordance with some embodiments of this disclosure.

Referring now to FIG. 3, a write path process 300 that includes writing to the journal file is generally shown in accordance with an embodiment. The processing shown in FIG. 3 can be performed by an embodiment of a file system test application executing on a processor. At 302, a file and an offset (e.g., "block X") are chosen from a plurality of files in the file system being tested. At 304, a new block is generated for block X. The new block can include an application block header that contains a generated test header and application block data that includes a generated test data sequence containing a plurality of chunks as described previously herein. At 306, the offset in the file is locked to prevent other applications from writing to the block. In an embodiment, a logical lock is also placed on the journal file. At 308 the journal file is read to find the most recently written record (e.g., "record Y") for block X in the journal file. At 310, the generated test header is written to the journal file at record slot "Y+1 modulo N" (where N is the number of record slots for each block recorded in the journal) in the portion of the journal file corresponding to block X. At 312, the new block, including the generated test header and the generated test data sequence, is written to the selected file. At 314, the lock is released.

Figure 4:
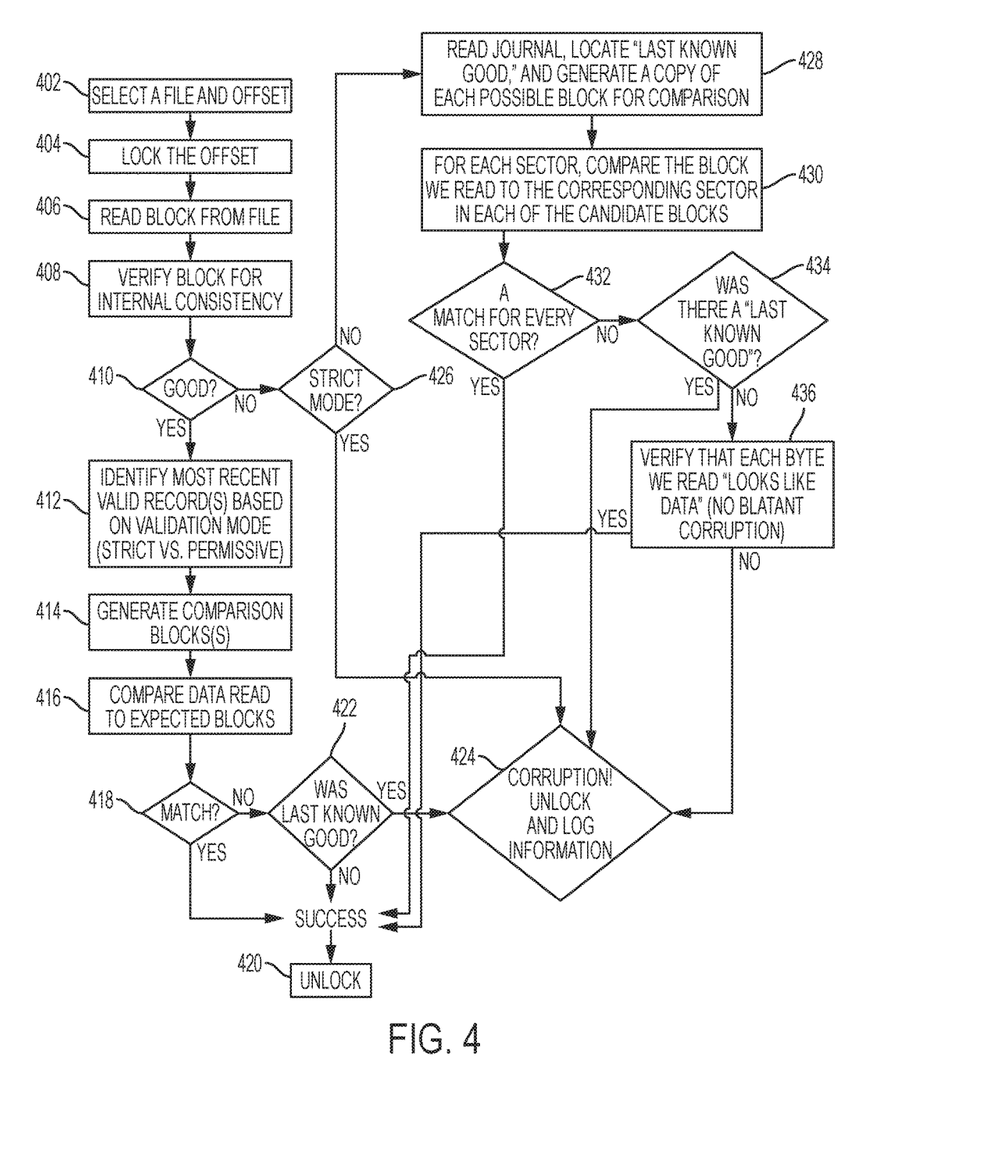
FIG. 4 depicts a read path process that includes reading from the journal file in accordance with some embodiments of this disclosure.

Referring now to FIG. 4, a read path process 400 that includes reading from the journal file is generally shown in accordance with an embodiment. The processing shown in FIG. 4 can be performed by an embodiment of a file system test application executing on a processor. At 402, a file and an offset (e.g., "block X") are chosen from a plurality of files in the file system being tested. At 404, the offset in the file is locked to prevent other applications from writing to the block. Block X is read from the file at 406 and at 408 block X is verified for internal consistency to determine whether the read data sequence is consistent with the read header.

If the block is not internally consistent (i.e., the expected contents and the read data do not match) as determined at 410, then 426 is performed to determine whether the file system test application is implementing a "strict mode." If the application is implementing in strict mode, then processing continues at 424 where an error message is generated to indicate that block X is corrupted and the information recorded in the journal file is printed for use in error analysis.

The error message generated at 424 indicates that the content of the read data (e.g., the test data sequence) is not what is expected. This may indicate that the file system under test has corrupted the data or otherwise disobeyed its documented semantics. The error message generated at 424 can indicate that the version of the read data (e.g., the test header) is not what is expected and thus, may indicate that the file system under test has returned stale data or dropped a write (e.g., that the data on disk looks okay but it doesn't match the journal file). Examples of errors that can be encountered include, but are not limited to: the incorrect block was read (e.g., meant to read block x but got block x−1; no write was done when a write should have been done; a write was performed, but invalid data was written (the invalid data could be a valid (but incorrect) block, garbage, a partial write (i.e. some but not all data got to disk) or perhaps simply a single bit was flipped, or any combination); a read saw old data (that had since been overwritten); a read got invalid data (i.e., the data is correct on disk, but in the process of the read, incorrect data was returned; the incorrect data could be garbage, it could be half old data, half new data, it could be almost the right data but with a random bit flipped, it could be data from a different file, it could be data from a different part of the same file etc); and/or a write happened, but the data went to the wrong place on disk.

If, as determined at 426, that the application is not implementing a strict mode then processing continues at 428 where a last known good block X is located in the journal file and a copy of each possible block is generated for comparison. Processing continues at 430, where for each sector, the block that was read is compared to the corresponding sector in each of the blocks generated for comparison. At 432 it is determined whether every sector in the block matches the sectors in one of the blocks generated for comparison. If it is determined that they do match, then processing continues at 420 to unlock the offset in the file in order to allow other applications to write to the block. If it is determined, at 432, that there is no match, then processing continues at 434 to determine whether there is a block in the journal file marked as "last known good" (write was committed to disk before returning to the test program). If so then there should have been a match and since there was none then processing goes to 424 to generate an error message. Otherwise (no "last known good" block) then no recent write for that block was committed to disk, and processing goes to 436 to verify whether the block contains data that appears valid. That is, data that could have been produced by the test program.

If the block is internally consistent (i.e., the expected contents and the read data do match) as determined at 410, 412 is performed to examine the journal file to identify the most recent record or records, according to the validation mode being used (permissive or strict). Processing goes to 414 to produce comparison blocks for each record. In 416 the data in the block read from the file is compared to the comparison block. If the match is successful at 418, then processing moves to 420 to unlock the offset in the file. If the comparison fails then 422 checks if the last record was the "last known good" record. If so then the match should have occurred, and thus corruption has been detected. If there was no "last known good" record then there may have been no known good data that was written for this offset, and verification is considered successful.

Embodiments of the processing shown in FIGS. 3 and 4 can be implemented in a single-node setting or in a distributed setting, provided that the main file and the journal file are shared among all nodes. In embodiments, the journal file and the file to be tested can be stored in the same file system, as the likelihood of two simultaneous and matching dropped writes or stale reads is small. In other embodiments, the journal file and its main file can be stored in separate file systems. In this setting a trusted previous version of the file system under test can be used to store the journal file. This is useful as part of the software development cycle, where the old version of the software is trusted and the new version is considered unstable/untrusted.

Embodiments provide a process for testing a DFS for correctness including detecting dropped writes and stale reads.

Further embodiments can also be utilized to continue testing in the presence of node failures when the file system being tested is POSIX compliant. A DFS crash can result from events such as, but not limited to: power failure, OS failure, file system failure, and network failure. An event of this type is referred to generically herein as a "node failure." Embodiments can be utilized when a POSIX-compliant file system crashes with active pending write requests. Suppose that a synchronous write has occurred (fsync( ) completed after write completed, open( ) with O_SYNC or O_DIRECT with write( ) succeeding, etc.). If a node failure occurs, then data that was written will be there on disk when the machine comes back up. Note that this is a statement about persistence, not about atomicity: if the fsync or O_SYNC-write did not return successfully due to a node failure, then, when the system comes back up (e.g., is restored), a mixture of old and new data may be stored on disk.

Similarly, if "normal writes" rather than synchronous writes are being used, the application has the same guarantee about file contents after a node failure: that is that the data on disk will be all old, all new, or some mixture of old and new. In an embodiment, the smallest addressable file system unit is a file system sector, so this mixture can only occur on one or more file system sector boundaries. In other words, the contents of any given sector are expected to be from the same write, but different sectors can be from different writes. Suppose that node A has synchronously written a block to offset 0 of file 1. After this, suppose node B begins non-synchronously writing a block to offset 0 of file 1 and encounters a node failure shortly afterward. Now node A reads the block at offset 0 of file 1 and attempts to verify it. Because the block may now be a mixture of the data from the write from node A and the write from node B, the data read by node A is no longer an internally-consistent application block. In a naïve implementation, this results in a verification failure, when the data on disk is actually acceptable based on the POSIX guarantees. In a DFS test that is deliberately introducing a node failure, it is important that I/O applications continue to run as various nodes in the cluster crash, as this imitates what a real customer application might do. In embodiments, this behavior is achieved through enhancing the per-block records recorded in the journal file, and enhancing the read and write paths described previously with respect to FIGS. 3 and 4.

The journal file entries can be enhanced as shown below to include recording whether or not the write of the most recent record has completed and whether or not the data has been synchronized to disk (via O_DIRECT, O_SYNC, fsync, or similar).

---

BLOCK 1
Most recent record: <slot number>
RECORD SLOT 1
    Did write finish: 0|1
    Was synced to disk: 0|1
    Cksum for quick comparison purposes
    Application block header
RECORD SLOT 2
. . .
RECORD SLOT N
BLOCK 2
. . .

---

Embodiments of the enhanced write and read paths are based on a "log-write-commit" approach. The algorithms described herein include a "strict" mode for use when node failures are unexpected, in which any unexpected file contents are rejected. The write path in the strict mode is more complex than that shown in FIG. 3 however, the read path in strict mode is the same as that shown in FIG. 4. The algorithms described herein also include a "permissive" mode for use when node failures are expected. The permissive mode is more forgiving and can be used to verify that the file system under test does not introduce corruption during failure scenarios. In the permissive mode, the read path is different than the read path in strict mode.

Embodiments of algorithm that can handle node failure before, during, or after any element of a write are shown below. It is assumed that appropriate fcntl locks on the main file and the journal file are acquired to ensure mutual exclusion. Numerals are elements of the write algorithm. Letters indicate a location where a node failure can occur.

An embodiment of an enhanced write path follows:

A
1 Write a new record to the journal file, logging an intent to write
B
2 Make the write to the main file
C
3 Log to the journal file that the write completed
D
4 Optional: Call fsync( ) or fdatasync( )
E
5 If file was opened with O_[D]SYNC or O_DIRECT, or if fsync( ) or fdatasync( ), etc. was called, then update the journal file stating that the data is definitely on disk (it was synced).
F O_DIRECT and O [D]SYNC are requests made to the OS when the file is opened, and they specify the desired semantics for writes from the OS. O_SYNC requires that all data and metadata be on disk before the write returns (metadata can include information such as "What is the file size? When was the file last modified?), with O_SYNC being the strictest of the three modes. O_DSYNC requires that data be on disk before the write returns, but not the metadata, and thus, this is a weaker guarantee. O_DIRECT means that no caching of data is done by the OS, and thus is the weakest as it specifies only that the data is not in cache (i.e., that it is in flight to the disk, but not that it has arrived on the disk).

Fsync( ) is a call that an application can make that says "When this returns, all data and metadata to this file are on disk." Fsync( ) is analogous to opening the file O_SYNC, but only happens on request. Fdatasync( ) means that all data is on disk, but not necessarily all metadata. This is analogous to O_DSYNC.

Note that O_DSYNC requires "some" aspects of metadata to be on disk, if they are required for being able to read the file back (for example, if the file is lengthened, the metadata for file size will be included by O_DSYNC).

An embodiment of an enhanced read path in a permissive mode follows:

Read the block and verify that it is of the proper format (e.g., verify internal consistency). The verification ignores mismatches, provided that the mismatches occur on a sector boundary and that the mismatched contents look like data from the data portion of an application block. In this case the mismatches are valid "mixtures."

Look up the most recently synced shadow record in the journal file (i.e., the "last known good write"). If none were found, start with the oldest record According to POSIX, read( ) returns the most recent write, so the result of the read from the file should match either the last-known-good write or a more recent one—but nothing older than that.

Starting from the record found in in the previous element, and going towards the newer end of the journal, compare the read application block header to the records in the journal file.

If a match is found, then the read block is correct (modulo mixture on sector boundaries) and a record of the block being written, so there is no error condition.

If a "last known good write" was located, the read block can be revisited to verify the "mixtures" as follows: generate the complete block for each record in the journal, beginning at the "last known good write" and moving forward in time—compare each mismatching sector to the corresponding sector from each record in the journal; if a match is found, it is known which record corresponds to the sector; if a match is not found, then this indicates a more pernicious form of corruption where valid data belongs to a different block. The invalid data might be from another place in the file or from another file entirely. In an embodiment, if no "last-known good" write is found, and if fewer than N+1 writes have been made, then a "null block" (a block consisting entirely of null bytes) is included in the set of possible blocks.

If no match is found and a record was synced to disk, it can be concluded that the file is corrupt. Otherwise, if no match is found, it can be concluded that data was never synced to disk. This suggests that the length of the history (N) was too short and that the original journal record was overwritten. Note that this may fail to detect corruption and may result in a false negative.

An embodiment of an enhanced read path in a strict mode follows:

Read the block and verify that it is of the proper format.
Look up the most recent shadow record.
If what was read from the main file matches the most recent shadow record, then the block is correct.
Otherwise, the block is corrupt.

Note that in both the enhanced permissive and strict read paths, if an internally consistent block (i.e. one without any mixing) that was written by another node is read and there's a record of it in the journal file, it is noted as synced to disk and is therefore the last known "good" block. This uses the same code path as element 5 in the enhanced write path described above. This allows non-synchronous-I/O workloads operating in permissive mode to benefit from the extra verification afforded by synchronous I/O. This is true for the IBM Spectrum Scale implementation but may not be true for other DFSs, so this behavior is not included in the generic method.

Following is an analysis of correctness in the presence of node failures. Failures on the read path will not introduce corruption and do not need to be considered. The impact of failures on the write path at particular locations follows:

A (before): Doesn't matter, the previous record is still correct.

1 and B (after the initial log): The enhanced read in permissive mode and strict mode both assume that the most recent record may not be accurate and they look for a last-known-good write position instead.

2 (during write to main file): Until data is known to have been synced to disk, the analysis for C holds.

C (after write to main file): When go to read( ), the data may or may not be on disk. It is possible that a write was performed with O_[D]SYNC or O_DIRECT. As it is not known whether or not the write( ) returned (without examining program logs), the application cannot be certain that the latest data in the file is correct, and in permissive mode the possibility of mixed old-and-new blocks at that offset is acknowledged.

3 and D (after log write complete): If O_[D]SYNC or O_DIRECT was used, the application can be confident that the data is on disk. Otherwise the application does not know yet whether the data is on disk.

E (after optional fsync( ) or fdatasync( ) call): The application is still not yet confident that the data is on disk because it has not been logged.

F (after fsync( ) and fdatasync( ) calls have returned and it is logged that it is on disk): All records are on the disk and the files are consistent.

In a permissive read environment where the file system may frequently fail at element B of the write, a long history length (N) may be required in order to know the correct value of the block. If there is a failure at write element C through write element 5, a write made with O_[D]SYNC or O_DIRECT or a fsync( )'d write could be lost and it would not be detected. In this case, a synchronous write finished, meaning that it is on disk, but the journal does not record this. After a node failure in the write path, the journal record corresponding to this synchronous write is not tagged as synced to disk, and as a result it is not a candidate for being the last known good write entry. This in turn means that if a permissive read operation begins, it will incorrectly allow older data to still be in the file. Note that due to element 3 of the write, this case can be manually verified by examining traces emitted by the writer if the failure occurs after element 3 of the write.

Thus, embodiments as shown above can be utilized to provide a DFS verification tool (e.g., a file system test application) that can recover from POSIX-compliant node failures. In embodiments, the file system test application can itself inject the node failures and then verify the file system state after recovery techniques described herein. Trigger points can be put into the write and read paths of an algorithm executed by the file system test application, for example immediately after a location F in the write path when the file system is in a consistent state.

In an embodiment, if the application block size is not a multiple of the file system sector size, a mixture of old and new writes can occur in the application block header itself. The probability of this case decreases as the application block size increases. The same issue can arise if the application does I/O to offsets that are not a multiple of the file system sector size. In this case, "bad" mixtures (i.e. a mixture of correct data and incorrect but valid-looking data—for example, data from another block) will be accepted in step 1 of the permissive read. Provided that synchronous writes are made (or multiple nodes are involved), and provided that the history length is "long enough", then the revisiting element of the permissive read will detect this case.

Figure 5:
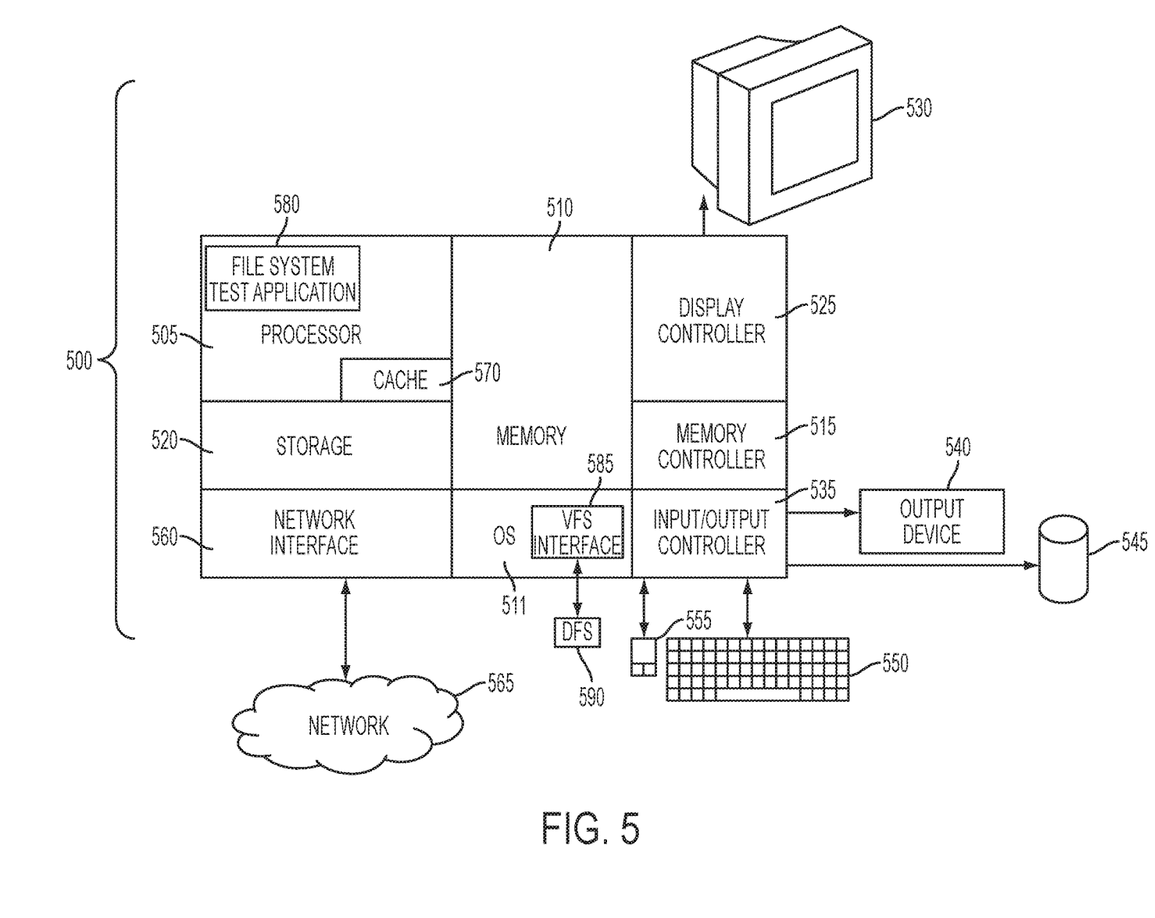
FIG. 5 depicts a block diagram of a computer system for implementing some or all aspects of the system, according to some embodiments of this disclosure.

FIG. 5 illustrates a block diagram of a computer system 500 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer.

In some embodiments, as shown in FIG. 5, the computer system 500 includes a processor 505, memory 510 coupled to a memory controller 515, one or more distributed file systems (DFS) 590, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.). The processor 505 also includes at least one file system test application 580 for performing the processes described herein.

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services. As shown in FIG. 5, the OS includes a virtual file system (VFS) interface 585 which is in communication with the DFS 590.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the systems and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 500, such as that illustrated in FIG. 5.

Technical effects and benefits of some embodiments include the ability to detect corruption, provide proof that a file system error has occurred, and accurately point to the location of the corruption along with indicating the expected contents of the location. In addition, embodiments can utilize a journal file to determine that the correct (i.e., expected) application block was read by the file system being tested. Still further, embodiments can be utilized to allow file system testing to continue even when a node failure occurs.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for testing distributed file systems, the method comprising:
   injecting an error at an offset of a block in a file in a distributed file system;
   performing a recovery action that includes the offset of the block in the file system;
   generating test data for the block that will detect silent write failure and stale read failures, the generating including:
   randomly selecting a starting value from a plurality of possible starting values;
   creating a test header that includes the starting value; and
   creating a test data sequence that starts with the starting value;
   writing, by the distributed file system, the test header and the test data sequence to the block in the file;
   reading, by the file system that is being tested, contents of the block from the file subsequent to the writing, the read contents including a read header and a read data sequence;
   determining expected contents of the data sequence based on contents of the read header;
   comparing the expected contents of the data sequence to the read data sequence; and
   outputting an error indication based on the expected contents not being equal to the read contents, the error indication including human-readable content including a time of the writing and the expected contents.

2. The method of claim 1, wherein the test data sequence is divided into a plurality of chunks characterized by a chunk size, the plurality of chunks including a first chunk of the chunk size, at least one intermediate chunk of the chunk size, and a last chunk that is smaller than or equal to the chunk size, wherein a portion of the test data sequence in the first chunk starts with the starting value and a portion of the test data sequence in the at least one intermediate chunk and the last chunk start with a zero.

3. The method of claim 2, further comprising selecting the chunk size, wherein the chunk size of the block is different than a chunk size of at least one other block in the file.

4. The method of claim 1, wherein the writing is atomic within the file.

5. The method of claim 1, wherein the generating, writing, reading, determining, comparing and outputting are performed by multiple nodes simultaneously on the plurality of files.

6. The method of claim 5, wherein the generating, writing, reading, determining, comparing and outputting continue to be performed by a node in the multiple nodes subsequent to a failure of an other node in the multiple nodes.

7. The method of claim 1, further comprising writing the test header to a journal file corresponding to the block synchronously with writing the test header to the block in the file.

8. The method of claim 7, wherein the reading further comprises reading the journal file corresponding to the block, and the method further comprises comparing contents of the journal file to the read header and outputting an error indication based on the contents of the journal file not matching the contents of the read header.

* * * * *